(12) United States Patent
Kroupa et al.

(10) Patent No.: US 9,423,932 B2
(45) Date of Patent: Aug. 23, 2016

(54) ZOOM VIEW MODE FOR DIGITAL CONTENT INCLUDING MULTIPLE REGIONS OF INTEREST

(71) Applicant: Nook Digital, LLC, New York, NY (US)

(72) Inventors: Brandon Kroupa, San Francisco, CA (US); Tetsumasa Yoshikawa, Redwood City, CA (US)

(73) Assignee: Nook Digital, LLC, New York, NY (US)

( * ) Notice: Subject to any disclaimer, the term of this patent is extended or adjusted under 35 U.S.C. 154(b) by 189 days.

(21) Appl. No.: 13/923,701

(22) Filed: Jun. 21, 2013

(65) Prior Publication Data

US 2014/0380237 A1    Dec. 25, 2014

(51) Int. Cl.
G06F 3/048    (2013.01)
G06F 3/0483    (2013.01)
G06F 3/0488    (2013.01)

(52) U.S. Cl.
CPC ......... *G06F 3/0483* (2013.01); *G06F 3/04883* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 4,896,543 A | 1/1990 | Gullman | |
| 5,359,712 A * | 10/1994 | Cohen | G11B 27/034 348/E5.051 |
| 5,633,471 A | 5/1997 | Fukushima | |
| 5,844,557 A | 12/1998 | Shively, II | |
| 6,259,438 B1 | 7/2001 | Fleck et al. | |
| 6,956,564 B1 | 10/2005 | Williams | |
| 7,649,524 B2 | 1/2010 | Haim et al. | |
| 7,840,912 B2 | 11/2010 | Elias et al. | |
| 7,898,541 B2 | 3/2011 | Hong et al. | |
| RE42,738 E | 9/2011 | Williams | |
| 8,059,101 B2 | 11/2011 | Westerman et al. | |
| 8,164,596 B1 * | 4/2012 | Bech | G06T 13/00 345/473 |
| 8,233,772 B1 * | 7/2012 | Young | H04N 5/783 386/278 |

(Continued)

FOREIGN PATENT DOCUMENTS

EP    0722150 A1    7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Hua Lu
(74) *Attorney, Agent, or Firm* — Finch & Maloney PLLC

(57) ABSTRACT

Techniques are disclosed for a zoom view mode for use with digital content including multiple regions of interest. Regions of interest may include portions of viewable digital content (e.g., panels of a comic book). In some cases, the mode may be invoked using a zoom command (e.g., double tap) to zoom in on a region of interest. After the mode has been invoked, the user may shift from one region of interest to another using a shift command (e.g., swipe), along a shift path of motion. The shift path of motion may have a non-constant speed and/or non-linear shape (e.g., arc-shaped). In some cases, the shift path of motion speed may be defined by a non-linear easing function curve. In some cases, the mode may be configured to present an entire page when first shifting to a region of interest on that page, to provide overall context to the user.

20 Claims, 10 Drawing Sheets

(56) References Cited

U.S. PATENT DOCUMENTS

| | | | |
|---|---|---|---|
| 8,239,413 | B2 | 8/2012 | Hubert |
| 8,274,536 | B2 | 9/2012 | Chaudhri et al. |
| 8,286,104 | B1 | 10/2012 | Yonge-Mallo |
| D670,713 | S | 11/2012 | Cranfill et al. |
| RE44,103 | E | 3/2013 | Williams |
| 8,400,417 | B2 | 3/2013 | Ording et al. |
| 8,508,494 | B2 | 8/2013 | Moore |
| 2001/0025289 | A1 | 9/2001 | Jenkins et al. |
| 2002/0116421 | A1 | 8/2002 | Fox et al. |
| 2005/0078182 | A1* | 4/2005 | Lipsky ............... G06F 3/0481 348/143 |
| 2007/0047002 | A1 | 3/2007 | Hull et al. |
| 2008/0016472 | A1* | 1/2008 | Rohlf ............... G06F 17/30241 715/848 |
| 2008/0024615 | A1* | 1/2008 | Alvarez ............... H04N 5/232 348/211.7 |
| 2008/0036747 | A1 | 2/2008 | Hope |
| 2008/0253735 | A1* | 10/2008 | Kuspa ............... G11B 27/005 386/343 |
| 2010/0100854 | A1 | 4/2010 | Russell et al. |
| 2010/0192086 | A1 | 7/2010 | Kocienda et al. |
| 2010/0218140 | A1* | 8/2010 | Feke ............... A61B 5/0059 715/810 |
| 2010/0229130 | A1 | 9/2010 | Edge et al. |
| 2010/0259482 | A1 | 10/2010 | Ball |
| 2010/0262659 | A1 | 10/2010 | Christiansen et al. |
| 2010/0318895 | A1* | 12/2010 | Steinberger ........... G06F 3/0481 715/234 |
| 2011/0258542 | A1 | 10/2011 | Kenney et al. |
| 2012/0021828 | A1* | 1/2012 | Raitt ............... A63F 13/12 463/31 |
| 2012/0028707 | A1* | 2/2012 | Raitt ............... A63F 13/10 463/31 |
| 2012/0056821 | A1 | 3/2012 | Goh |
| 2012/0127110 | A1 | 5/2012 | Amm et al. |
| 2012/0131463 | A1* | 5/2012 | Lefler ............... G06F 3/0483 715/730 |
| 2012/0139879 | A1 | 6/2012 | Kim et al. |
| 2012/0221938 | A1 | 8/2012 | Patterson et al. |
| 2012/0235901 | A1 | 9/2012 | Binder |
| 2012/0242579 | A1 | 9/2012 | Chua |
| 2012/0242584 | A1 | 9/2012 | Tuli |
| 2012/0249768 | A1 | 10/2012 | Binder |
| 2012/0280947 | A1 | 11/2012 | Weaver et al. |
| 2012/0311438 | A1* | 12/2012 | Cranfill ............ G06F 17/30011 715/256 |
| 2012/0318972 | A1* | 12/2012 | Bream ............... H01J 49/443 250/282 |
| 2012/0329529 | A1 | 12/2012 | Van Der Raadt |
| 2013/0016045 | A1 | 1/2013 | Zhao et al. |
| 2013/0036383 | A1 | 2/2013 | Yuan et al. |
| 2013/0063364 | A1 | 3/2013 | Moore |
| 2013/0076632 | A1 | 3/2013 | Sirpal et al. |
| 2013/0076637 | A1 | 3/2013 | Teltz |
| 2013/0076638 | A1 | 3/2013 | Sirpal et al. |
| 2013/0076781 | A1 | 3/2013 | Sirpal et al. |
| 2013/0088495 | A1* | 4/2013 | Bech ............... G06T 13/00 345/467 |
| 2013/0113699 | A1 | 5/2013 | Lim |
| 2013/0120271 | A1 | 5/2013 | Lee et al. |
| 2013/0135234 | A1 | 5/2013 | Hisano et al. |
| 2013/0139078 | A1 | 5/2013 | Chuang et al. |
| 2013/0139107 | A1 | 5/2013 | Jung |
| 2013/0162532 | A1 | 6/2013 | Cheng et al. |
| 2013/0185680 | A1 | 7/2013 | Chaudhri et al. |
| 2013/0194308 | A1 | 8/2013 | Privault et al. |
| 2014/0223271 | A1* | 8/2014 | Racklyeft ............ G06T 13/80 715/201 |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Tough-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trip Hands-on computing, http://www.n-trig.com/Content.aspx?Page=DigitalPencil, 3 pages, printed from the Internet on Jun. 20, 2013.

"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.

"Screen hotspot," Wikipedia, the free encyclopedia, http://en.wikipedia.org/wiki/Screen_hotspot, 1 page, printed from the Internet on May 15, 2013.

"EMR (Electro-Magnetic Resonance) Technology—The De Facto Standart for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptice Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," BRANDO—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM,

(56) References Cited

OTHER PUBLICATIONS http://www.engadget.com/2013/01/08/panasonic-mobile-devices-to-use-anoto-pattern-pen-, 4 pages, printed from the Internet on Jun. 20, 2013.
"Bluetooth 4.0 SmartPen The future just got a little brighter," Pogo Connect, http://tenonedesign.com/connect.php, 7 pages, printed from the Internet on Jun. 20, 2013.
Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.
Rigg, Jamie, "Sony tries to patent stylus with friction-based haptic feedback," posted on Nov 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," BRANDO—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Explaining how the sPen tech works (and is very diff than other styluses)," http://forum.xda-developers.com/showthread.php?t=, 1 page, printed from the Internet on Jan. 15, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Easing functions," Easing Functions Cheat Sheet, http://easings.net/, 3 pages, printed from the Internet on Jun. 17, 2013.
Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.
"Comics by comiXology," Comic Book Reader Guide, http://www.comicbookreaderguide.com/comics-by-comixology/, 24 pages, printed from the Internet on May 6, 2013.
Kanai, et al., "Intra-Rendition Navigation," Copyright 2012-2013 International Digital Publishing Forum (IDPF), 13 pages.

\* cited by examiner

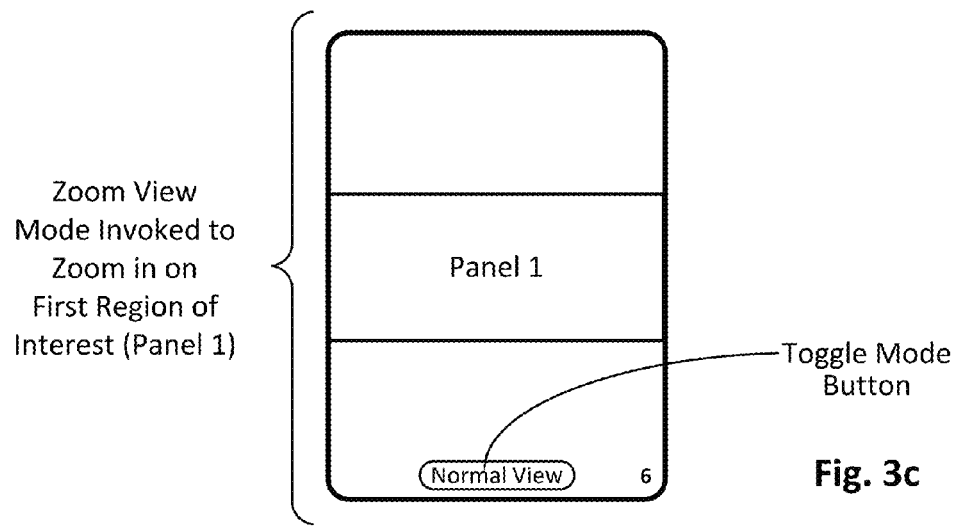
Fig. 3c — Zoom View Mode Invoked to Zoom in on First Region of Interest (Panel 1); Toggle Mode Button
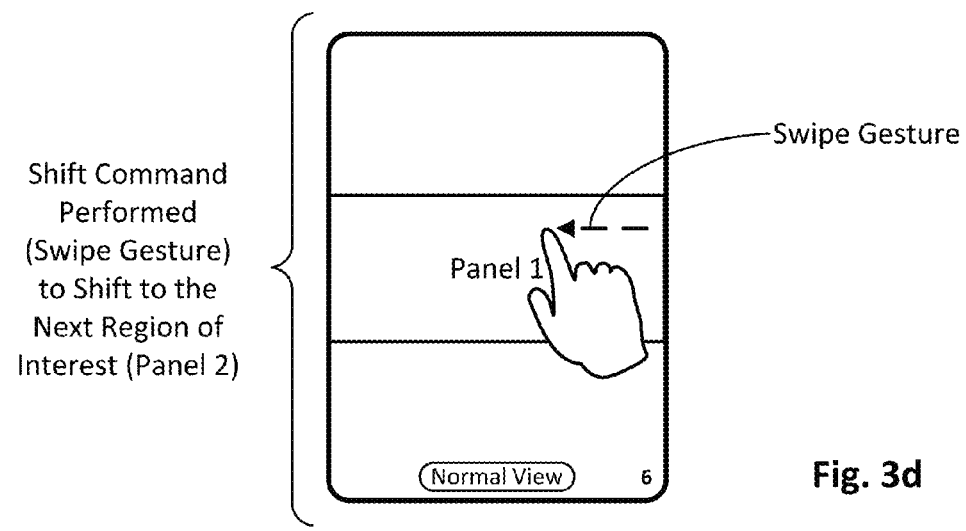
Fig. 3d — Shift Command Performed (Swipe Gesture) to Shift to the Next Region of Interest (Panel 2); Swipe Gesture
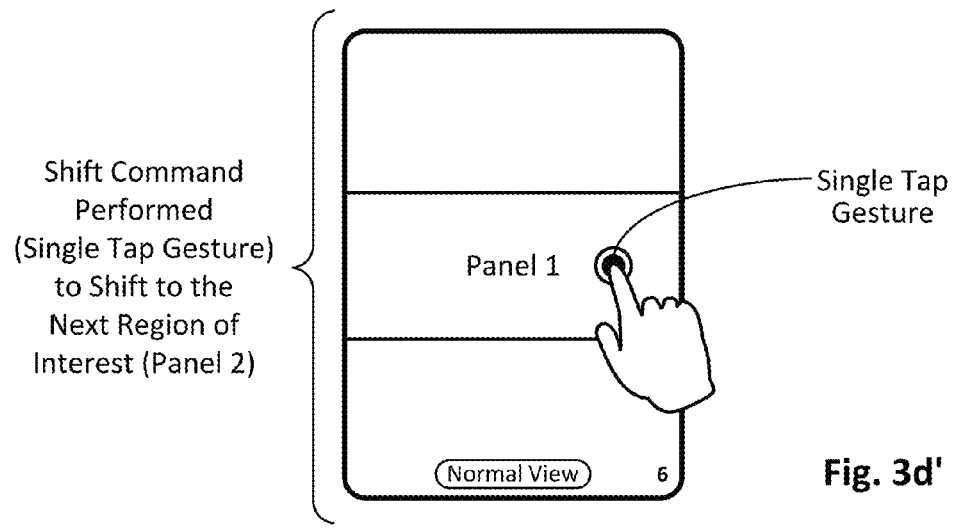
Fig. 3d' — Shift Command Performed (Single Tap Gesture) to Shift to the Next Region of Interest (Panel 2); Single Tap Gesture

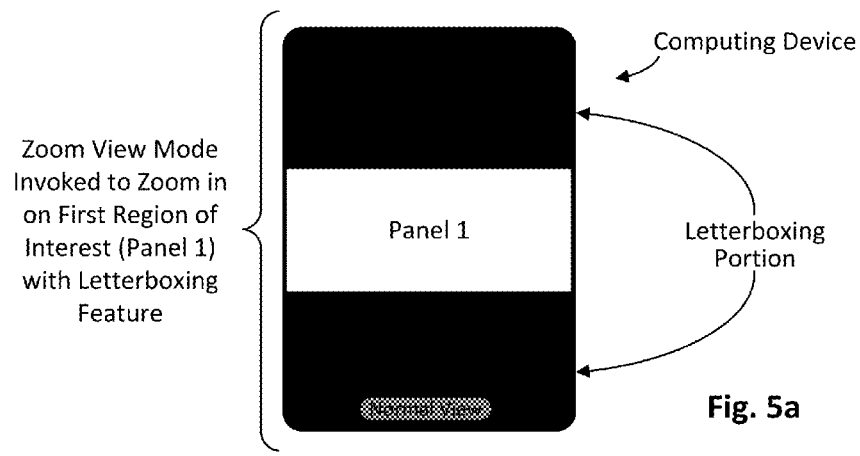
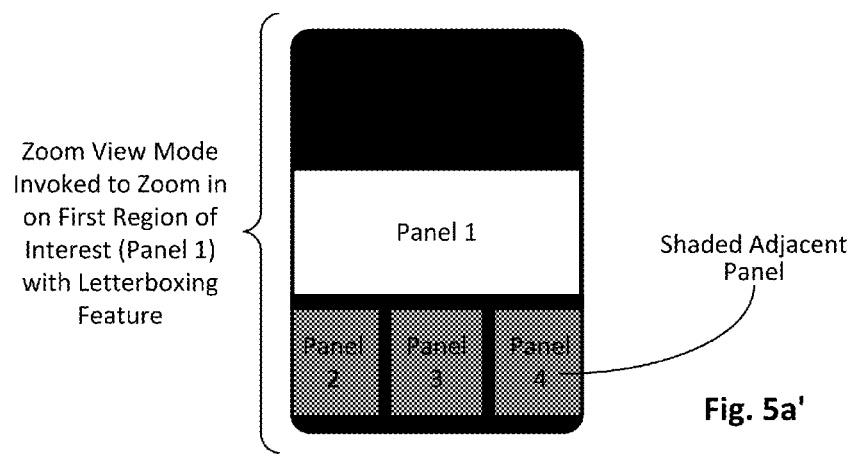
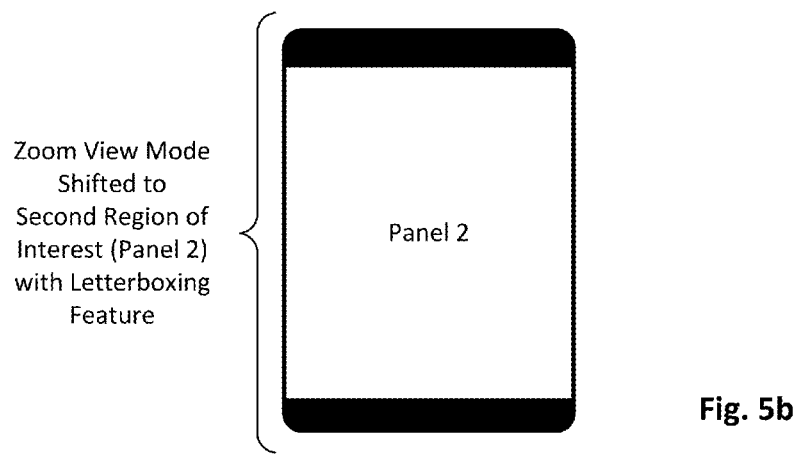

Ease-In Sinusoidal          Ease-Out Sinusoidal          Ease-In-Out Sinusoidal
            
Fig. 6a                     Fig. 6b                     Fig. 6c
Ease-In Exponential         Ease-Out Exponential         Ease-In-Out Exponential
            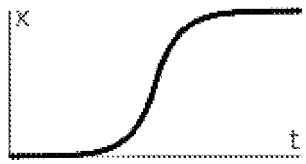
Fig. 6d                     Fig. 6e                     Fig. 6f
Ease-In Bounce              Ease-Out Bounce              Ease-In-Out Bounce
            
Fig. 6g                     Fig. 6h                     Fig. 6i

ZOOM VIEW MODE FOR DIGITAL CONTENT INCLUDING MULTIPLE REGIONS OF INTEREST

FIELD OF THE DISCLOSURE

This disclosure relates to computing devices, and more particularly, to user interface (UI) techniques for interacting with digital content on computing devices.

BACKGROUND

Computing devices such as tablets, eReaders, mobile phones, smart phones, personal digital assistants (PDAs), and other such computing devices are commonly used for displaying digital content. The content may be, for example, an eBook, a web page, an online article or blog, images, a movie or video, a map, just to name a few types. Such computing devices may also be useful for displaying a user interface that allows a user to interact with one or more applications running on the device. The applications may allow a user to read or browse through paginated digital content, such as electronic books (eBooks), magazines, catalogs, or comics, for example. The computing devices may also include a touch sensitive surface/interface for receiving user input such as a touch screen or a track pad (e.g., in combination with a non-touch sensitive display). The user interface may include, for example, one or more touch screen controls and/or one or more displayed labels that correspond to nearby hardware buttons.

BRIEF DESCRIPTION OF THE DRAWINGS

FIGS. 3*a-f* collectively illustrate an example zoom view mode of a computing device, in accordance with an embodiment of the present invention.

FIGS. 5*a-b* collectively illustrate an example letterboxing feature for a zoom view mode of a computing device, in accordance with an embodiment of the present invention.

FIGS. 6*a-i* show example non-linear easing function curves used to define the speed of zoom view mode paths of motion, in accordance with one or more embodiments of the present invention.

DETAILED DESCRIPTION

Figure 1A:
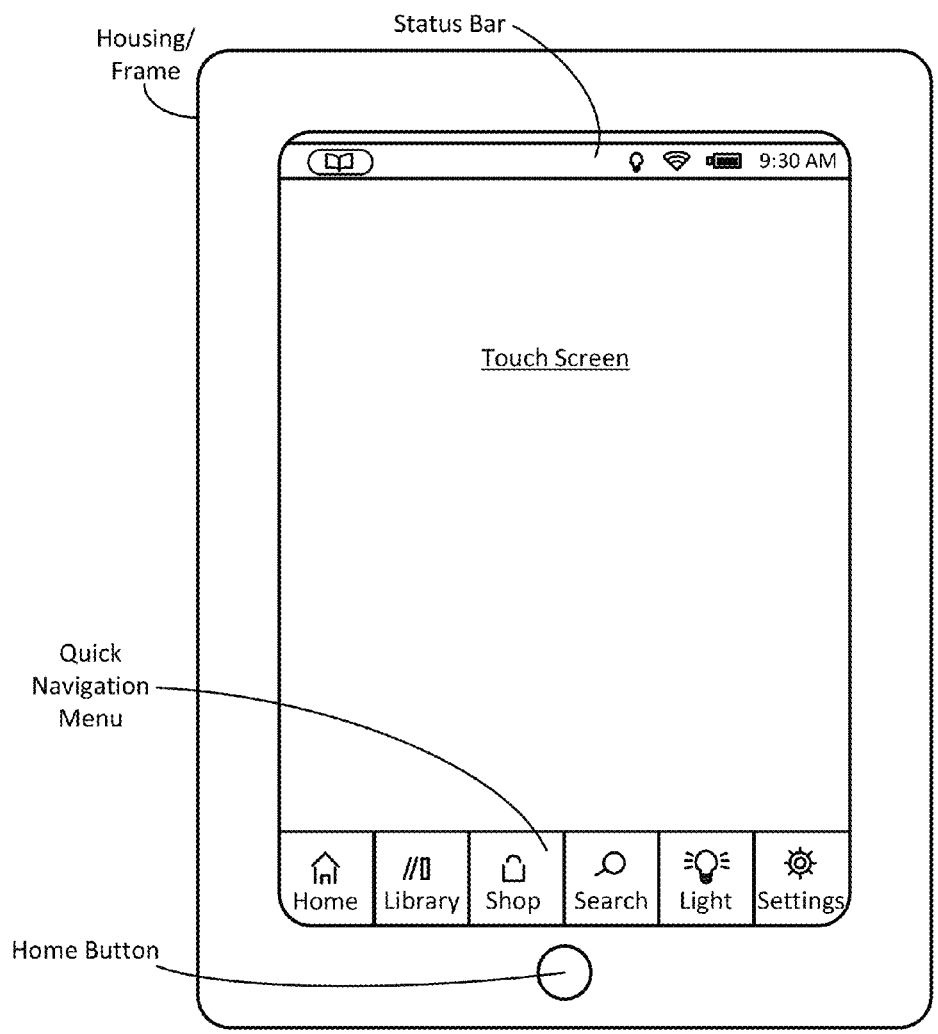
FIGS. 1*a-b* illustrate an example computing device having a zoom view mode configured in accordance with an embodiment of the present invention.

Techniques are disclosed for a zoom view mode for use with digital content including multiple regions of interest. Regions of interest may include panels (or other portions) of a comic book or other paneled content, for example. Multiple points of interest may exist in a given panel. In some cases, the mode may be invoked using a zoom command (e.g., a double tap gesture) to zoom in on a region of interest. After the mode has been invoked, the user may shift from one region of interest to another using a shift command (e.g., a swipe gesture), along a shift path of motion. The shift path of motion may be curved and/or have a non-constant speed. In some cases, the shift path of motion is arc-shaped and the speed of shifting motion along that path is defined by a non-linear easing function curve. So, rather than moving in a straight line while zooming from one region of interest to another, that motion may occur for instance in an arc when the easing equation follows a bell curve, which translates to slow motion at first, then very fast motion in the middle, then slow motion before ending up at the new location (region of interest). In some cases, when changing from the last region of interest on a given page to the next page, the zoom view mode is configured to briefly present the next page in it entirety, so as to allow the user to get a sense of overall context, before zooming into the first region of interest on that next page. Numerous other configurations and variations will be apparent in light of this disclosure.

General Overview

As previously explained, computing devices such as tablets, eReaders, and smart phones are commonly used for displaying user interfaces and digital content. The user of such devices can typically consume the displayed digital content with relative ease. In some instances, the digital content being consumed, such as electronic books (eBooks) or comics, may include multiple regions of interest. The regions of interest may include illustrations in a children's book or panels in a comic book, for example. Generally, when a user is reading through paginated digital content containing multiple regions of interest, such as a comic book, the pages of the comic book are shown in their entirety. Typically, the user can manually zoom in on individual panels or other portions of the comic book page as desired. The user may also be able to manually pan around on the page after having zoomed in on a section, to go from one region of interest to another. However, such techniques for moving from one region of interest to another may detract from the reading experience or otherwise lead to a diminished user experience.

Thus, and in accordance with one or more embodiments of the present invention, techniques are disclosed for a zoom view mode for use with digital content including one or more regions of interest. As will be apparent in light of this disclosure, the zoom view mode can be used, for example, with digital content acquired from a publisher or an online repository, or with user-generated content. In any such cases, the digital content may generally include various regions of interest that may be viewed using a zoom view mode as described herein. The regions of interest may include, for instance, illustrations within an eBook, panels within a comic, portions of a picture, or locations on a map, just to name a few examples. Continuing with the comic example, regions of interest may also include multiple panels, one or more dialogue boxes/bubbles within a panel, a drawing included in one or more panels, or any other page portion of the comic, for example. In some instances, a region of interest may even span multiple panel or multiple pages of the comic. In a more general sense, a region of interest may include any portion or area of the digital content being displayed as a whole. For ease of reference, the zoom view mode may be discussed herein in the context of paginated or similarly divided digital content, such as a comic book. However, the zoom view mode may be used with any digital content including multiple regions of interest, as will be appreciated in light of this disclosure.

In some embodiments, the zoom view mode may be invoked using a zoom command to zoom in on a region of interest on a page of digital content. The zoom command may include, for example, a double tap gesture (for touch sensitive computing devices) or a double click input (for non-touch sensitive computing devices). In some cases, the zoom view mode may be configured to zoom in on the first region of interest on the page regardless of where on the page the zoom command was performed. In other cases, the zoom view mode may be configured to zoom in on the region of interest closest to where the zoom command was performed. In any case, once the zoom view mode has been invoked using a zoom command, the user can then shift between regions of interest using a shift command. The shift command may include, for example, a swipe gesture or tap gesture (for touch sensitive computing devices) or an arrow key input or click input (for non-touch sensitive computing devices). In some embodiments, the zoom view mode may be exited by performing, for example, another zoom command after the mode has been invoked.

When zooming in on/out from a region of interest or shifting to another region of interest using the zoom view mode, the paths of motion for such actions may include any combination of zooming, panning, scanning, scrolling, tilting, page switching, and/or any other suitable technique. In some embodiments, the zoom view mode may be configured such that the characteristics of the paths of motion may enhance the user experience, as will be discussed in turn. For ease of description, the paths of motion for the zoom view mode will be referred to herein as: a) an invoke mode path of motion, which is the path of motion used when zooming in on a region of interest in response to a zoom command used to invoke the zoom view mode; b) an exit mode path of motion, which is the path of motion used when zooming out from a region of interest in response to a zoom command used to exit the zoom view mode; and c) a shift path of motion, which is the path of motion used to shift from a first region of interest to a second region of interest in response to a shift command. In some cases, the path of motion is arc-shaped and the speed of shifting motion along that path is defined by a non-linear easing function curve. So, rather than moving in a straight line while zooming from one region of interest to another, that motion may occur for instance in an arc when the easing equation follows a bell curve. This easing equation may cause slow motion along the path at first, then very fast motion in the middle portion of the path, then slow motion on the last portion of the path before arriving at the new region of interest.

In some embodiments, the paths of motion for the zoom view mode may have non-constant speeds, regardless of the path shape. For example, the shift path of motion may start at a fast speed and decelerate before reaching the second region of interest or it may start at a slow speed and accelerate before reaching the second region of interest. In some embodiments, one or more of the paths of motion may start at a slow speed, accelerate to a fast speed, and then decelerate before reaching the second region of interest. In other embodiments, one or more of the paths of motion may start at a fast speed, decelerate to a slow speed, and then accelerate before reaching the second region of interest. In some embodiments, the zoom view mode may use one or more easing functions to assist with the speed of the paths of motion, as will be discussed in turn. In some embodiments, the path of motion may include visual animations, transition sounds/music, and/or tactile feedback that may enhance the user experience. Visual animations may include, for example, a bouncing effect when arriving at an illustration in a children's eBook when using the zoom view mode to shift from one illustration to another. Transition sounds/music may include, for example, sound effects played when shifting from a first comic panel to a second one. Tactile feedback may include, for example, haptic technology used to provide vibrations to the user when shifting from a first to a second region of interest. As previously explained, the motion path may be curved or arc-shaped but may also be straight line in some cases, wherein motion speed along that straight path is irregular or otherwise modulated to provide a visual effect.

In some embodiments, the zoom view mode may include a provide context feature, such that when a user shifts from a region of interest on a first page to a region of interest on a second page (e.g., using a shift command), the mode may be configured to automatically display (or otherwise present) for a brief period the entire first page and/or the entire second page before zooming in to the region of interest on the second page. The brief period of time can be hard-coded or user-configurable and is intended to give the user a meaningful or otherwise useful glimpse of the content page. In still other cases where the zoom view mode includes the provide context feature, the mode may be configured to automatically zoom out to show the entire page for a brief period (e.g., 2-5 seconds) during each transition to a new region of interest on that same page.

In some instances, when zoomed in on a region of interest using the zoom view mode, more than just the region of the interest may be displayed or otherwise presented. This may occur, for example, if the region of interest is not the same size as the display area or if the region of interest is irregularly-shaped. Therefore, in some embodiments, the zoom view mode may include a letterboxing feature that can be used to focus on or otherwise accentuate the region of interest. Focusing on the region of interest may include, for example, partially or completely shading the additional content outside of region of interest, hiding the additional content, or placing bars around the region of interest to cover the additional content. For example, when using the zoom view mode with a digital comic to zoom in on a particular panel, the letterboxing feature may cause the panels adjacent to the particular panel to be covered with black bars or cause them to be partially shaded. In some such embodiments, the letterboxing feature may be dynamic, such that the technique used to focus on the region of interest changes as the user shifts from one region of interest to another, as will be apparent in light of this disclosure.

In some embodiments, the zoom view mode as variously described herein may be configured at a global level (e.g., based on the UI settings of the computing device) and/or at an application level (e.g., based on the specific application being used to interact with the digital content). For example, the zoom view mode may be configured to be enabled for some applications and disabled for others. To this end, the zoom view mode may be user-configurable, hard-coded, or some combination thereof (e.g., where some aspects are user-configurable and others are hard-coded), as will be apparent in light of this disclosure. Further, the zoom view mode as variously described herein may be included initially with the UI (or operating system) of a computing device or be a separate program/service/application configured to interface with the UI of a computing device to incorporate the functionality of the zoom view mode as variously described herein. In some embodiments, the zoom view mode may come in the form of a computer program product (one or more non-transient computer readable mediums) that includes a plurality of instructions non-transiently encoded thereon to facilitate operation of an electronic device according to a process that includes the functionality of the zoom view mode as variously described herein.

As will be apparent in light of this disclosure, the zoom view mode may be used on computing devices that are touch sensitive, such as various smartphones, tablets, and eReaders. In such computing devices, user input (e.g., the input used to perform a zoom or shift command) may be referred to as contact or user contact for ease of reference. However, direct and/or proximate contact (e.g., hovering within a few centimeters of the touch sensitive surface) may be used to provide user input to a touch sensitive computing device, depending on the specific touch sensitive interface being used. In other words, in some embodiments, the zoom view mode may be invoked even without physically touching a touch sensitive computing device or its touch sensitive interface. Also note that the user contact (whether direct or proximate) may be provided by the user's hand or another suitable body part, or a stylus or some other suitable implement, for example. Numerous variations and configurations will be apparent in light of this disclosure.

Computing Device and Configuration Examples

Figure 1B:
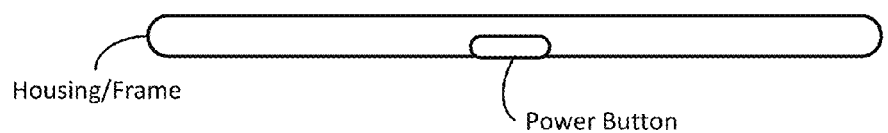

FIGS. 1a-b illustrate an example computing device having a zoom view mode configured in accordance with an embodiment of the present invention. The device could be, for example, a tablet computer such as the NOOK® Tablet by Barnes & Noble. In a more general sense, the device may be any computing device capable of displaying digital content, such as a smart phone, eReader, tablet computer, laptop, or desktop computer, for example. In some instances, the computing device may be touch sensitive and include a touch screen display or a non-touch display screen that can be used in conjunction with a touch sensitive surface/interface, such as a track pad. As will be appreciated in light of this disclosure, the claimed invention is not intended to be limited to any particular kind or type of computing device. For ease of description, an example computing device is provided herein with touch screen technology.

As can be seen with the example embodiment shown in FIGS. 1a-b, the device comprises a housing/frame that includes a number of hardware features such as a power button and a press-button (sometimes called a home button herein). A touch screen based user interface (UI) is also provided (although a computing device running the zoom view mode need not be touch sensitive), which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen controls and features, or different UI touch screen controls and features altogether, depending on the target application of the device. Any such general UI touch or non-touch controls and features can be implemented using any suitable conventional or custom technology, as will be appreciated.

Although the computing device shown in FIGS. 1a-d uses a touch screen display, other touch sensitive embodiments may include a non-touch screen and a touch sensitive surface such as a track pad, or a touch sensitive housing configured with one or more acoustic sensors, etc. As previously described, the computing device need not be touch sensitive and may receive input from physical buttons, directional pads, joysticks, mouse pointing devices, and physical keyboards, just to name a few other examples. Continuing with the example computing device shown in FIGS. 1a-b, the power button can be used to turn the device on and off, and may be used in conjunction with a touch-based UI control feature that allows the user to confirm a given power transition action request (e.g., such as a slide bar or tap point graphic to turn power off). In this example device, the home button is a physical press-button that can be used to display the device's home screen when the device is awake and in use. The home button or other buttons may also be used in conjunction with the zoom view mode to, for example, exit the zoom view mode after it has been invoked. Numerous other configurations and variations will be apparent in light of this disclosure, and the claimed invention is not intended to be limited to any particular set of control features or device form factor.

Figure 1C:
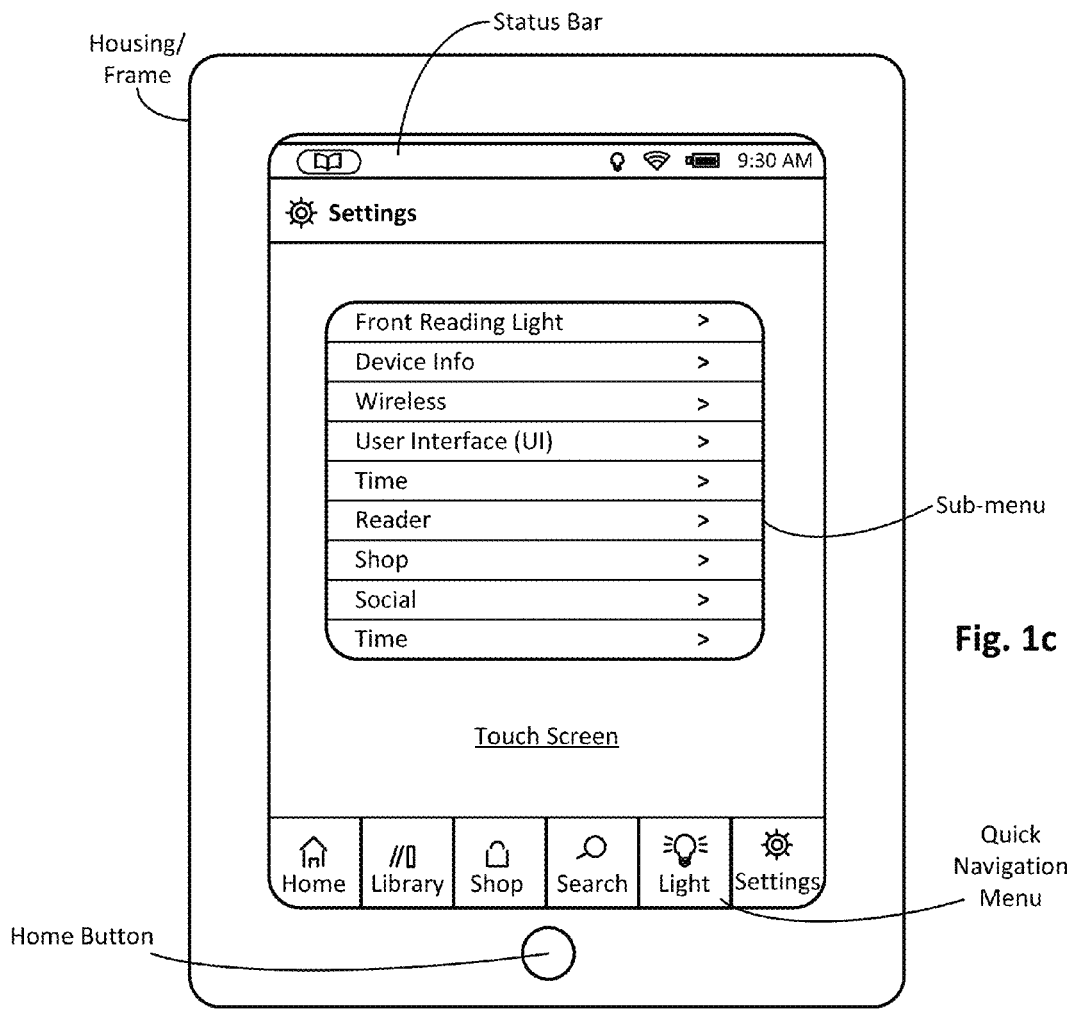
FIGS. 1*c-d* illustrate example configuration screen shots of the user interface of the computing device shown in FIGS. 1*a-b*, configured in accordance with an embodiment of the present invention.
Figure 1D:
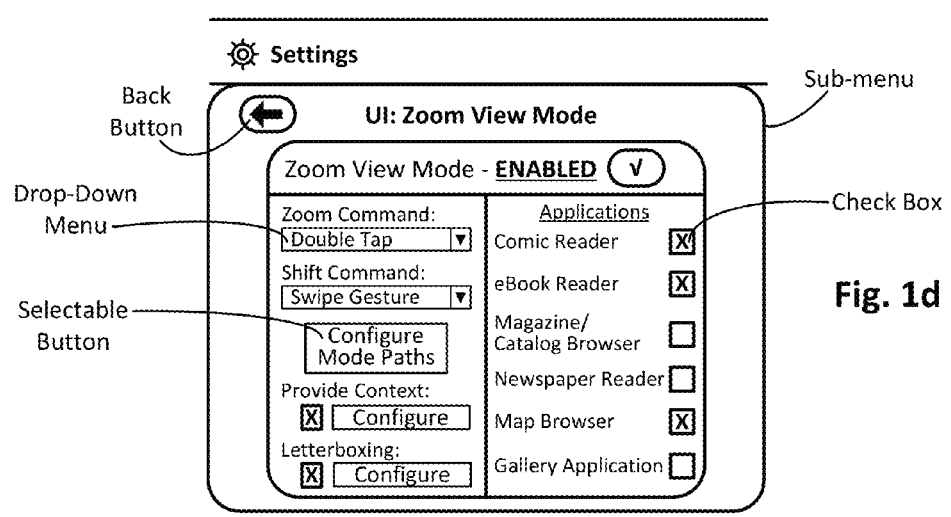

Continuing from FIG. 1a, the user can access a zoom view mode configuration sub-menu, such as the one shown in FIG. 1d by tapping or otherwise selecting the Settings option in the quick navigation menu, which causes the device to display the general sub-menu shown in FIG. 1c. From this general sub-menu the user can select any one of a number of options, including one designated User Interface (UI) in this specific example case. Selecting this sub-menu item (with, for example, an appropriately placed screen tap) may cause the Zoom View Mode configuration sub-menu of FIG. 1d to be displayed, in accordance with an embodiment. In other example embodiments, selecting the User Interface (UI) option may present the user with a number of additional sub-options, one of which may include a so-called zoom view mode option, which may then be selected by the user so as to cause the Zoom View Mode configuration sub-menu of FIG. 1d to be displayed. Any number of such menu schemes and nested hierarchies can be used, as will be appreciated in light of this disclosure. In other embodiments, the zoom view mode may be hard-coded such that no configuration is needed or otherwise permitted. The degree of hard-coding versus user-configurability can vary from one embodiment to the next, and the claimed invention is not intended to be limited to any particular configuration scheme of any kind, as will be appreciated in light of this disclosure.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates one or more touches (whether direct or proximate and whether made by a user's hand, a stylus, or some other suitable implement) in a particular location(s) into an electrical signal, which is then received and processed by the underlying operating system (OS), system software, and circuitry (processor, etc.) of the computing device. In some instances, note that the user need not actually physically touch the touch sensitive surface/interface to provide user input (e.g., when the touch sensitive surface/interface recognizes hovering input). In embodiments where the computing device is not-touch sensitive, input may be provided using a mouse, joystick, or directional pad, and one or more buttons, for example, to provide input similar to touching a touch screen. Additional example details of the underlying OS and circuitry in accordance with some embodiments will be discussed in turn with reference to FIG. 2a. As previously explained, in some cases, the zoom view mode may be automatically configured by the specific UI or application being used. In these instances, the zoom view mode need not be user-configurable (e.g., if the zoom view mode is hard-coded or is otherwise automatically configured).

Continuing with FIGS. 1c and 1d, once the Settings sub-menu is displayed (FIG. 1c), the user can then select the User Interface (UI) option. In response to such a selection, the Zoom View Mode configuration sub-menu shown in FIG. 1d can be provided to the user. In this example case, the Zoom View mode configuration sub-menu includes a UI check box that when checked or otherwise selected by the user, effectively enables the mode (shown in the Enabled state); unchecking the box disables the mode. Other embodiments may have the zoom view mode always enabled, or enabled by a switch or button, for example. In some instances, the zoom view mode may be automatically enabled in response to an action, such as when digital content including multiple regions of interest is being displayed (or otherwise presented to the user), for example. As previously described, the user may be able to configure some or all of the features with respect to the zoom view mode, so as to effectively give the user a say in, for example, which gesture to use for shifting from one region of interest to the next, the pause time associated with providing context, and/or what applications/digital content can use the zoom view mode, if so desired.

In the example case shown in FIG. 1d, once the zoom view mode is enabled, the user can configure various options related to this example mode. As shown, the left side of this example configuration screen shot includes multiple configurable options. The first option—Zoom Command—allows the user to set the input or action used to invoke the zoom view mode. As shown, the Zoom Command is set at a Double Tap gesture, based on the corresponding drop down menu. In this setting, the user can perform a double tap gesture on digital content including multiple regions of interest to invoke the zoom view mode. Other zoom commands, which may be selected using the appropriate drop-down menu, may include: selecting a toggle mode/invoke zoom view mode button, a pinch gesture, a double click input (for non-touch sensitive computing devices), or any other suitable input or action. As previously described, when invoking the zoom view mode on paginated digital content, the zoom command may be proximity based in some embodiments such that the mode zooms in on the region of interest closest to the location where the zoom command was performed. However, in other embodiments, the zoom command may cause the mode to zoom in on the first region of interest on the page, regardless of the location where the zoom command was performed. In some embodiments, the zoom command may be used to exit the zoom view mode as well. For example, in one embodiment, the user can perform a first double tap gesture on a page of digital content including multiple regions of interest to invoke the zoom view mode and then perform a second double tap gesture to exit the zoom view mode (and return to a normal viewing mode, for example).

The next option shown in the example configuration screen shot of FIG. 1d—Shift Command—allows the user to set the input or action used to shift between regions of interest. As shown, the Shift Command is set at Swipe Gesture, based on the corresponding drop down menu. In this setting, the user can use swipe gestures to shift to the next or previous region of interest. For example, if the zoom view mode is being used for paginated digital content that advances from left to right (e.g., an English eBook or comic), a right to left swipe gesture may be used to shift to the next region of interest, while a left to right swipe gesture may be used to shift to the previous region of interest. In another example, where the mode is being used for paginated digital content that advances from right to left (e.g., a manga comic), a left to right swipe gesture may be used to shift to the next region of interest, while a right to left swipe gesture may be used to shift to the previous region of interest. Other shift commands, which may be selected using the appropriate drop-down menu, may include: a single tap gesture (e.g., tap on the right side to shift to the next region of interest and tap on the left to shift to the previous), a click input (for non-touch sensitive computing devices), or any other suitable input or action.

A Configure Mode Paths selectable button is provided below the Shift Command drop-down menu to allow the user to configure the invoke mode paths of motion, the shift paths of motion, and/or the exit mode paths of motion. After selecting the Configure Mode Paths button, the user may be taken to another screen where various path options can be selected or otherwise configured. For example, the user may be able to set the shape and/or speeds of the paths of motion, whether animations are included for the paths of motion, or whether sound or music is played with the paths of motion, as will be discussed in turn. The next configurable option—Provide Context—allows the user to enable or disable the provide context feature. As previously described, in some embodiments, the zoom view mode may include a provide context feature, such that when a user shifts from a first region of interest on a first page to a second region of interest on a second page, the mode may be configured to display (or otherwise present) the entire first page and/or the entire second page. When enabled, the user can further configure the provide context feature by selecting the corresponding Configure button. For example, configuration options may include whether to show the entire first and/or entire second page, whether or not the mode continues to the second region of interest automatically, and the duration of time before continuing to the second region of interest automatically (if it does continue automatically).

The next configuration option—Letterboxing—allows the user to enable or disable the letterboxing feature. As previously described, in some embodiments, the zoom view mode may include a letterboxing feature that can be used to focus on the region of interest. For example, the letterboxing feature may black out or hide areas outside of the region of interest when the zoom view mode is invoked, as will be apparent in light of this disclosure. The Configure button may be selected to configure various options related to the letterboxing feature, such as how the letterboxing feature focuses on the region of interest, how the letterboxing feature changes when shifting from one region of interest to another, or other suitable options.

The right side of the example configuration screen shot shown in FIG. 1d includes an Applications section that allows the user to individually enable the zoom view mode for specific applications. Such a configuration feature may be helpful, for instance, in a tablet or laptop or other multifunction computing device that can execute different applications (as opposed to a computing device that is more or less dedicated to a particular application). As previously explained, in some embodiments, the zoom view mode may be application specific or configured at an application level. As shown in this example case, the zoom view mode is enabled for the Comic Reader, eBook Reader, and Map Browser applications. For completeness of description, the zoom view mode is disabled for the Magazine/Catalog Browser, the Newspaper Reader, and the Gallery Application, in this example case, such that conventional or customary zooming or navigation of digital content may be provided for those applications. In some embodiments, the zoom view mode may be related or tied to one or more specific applications of the device's UI (or operating system), such that the zoom view mode is only available, active, or running when such an application is available, active, or running. For example, the zoom view mode may only be available, active, or running when an eReader application is active and/or displayed, which may save memory and/or power of the computing device. Any number of applications or device functions may benefit from a zoom view mode as provided herein, whether user-configurable or not, and the claimed invention is not intended to be limited to any particular application or set of applications.

As can be further seen in FIG. 1d, a back button arrow UI control feature may be provisioned on the touch screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. Again, while FIGS. 1c and 1d show user-configurability, other embodiments may allow for a different configuration scheme or they may not allow for any such configuration, wherein the various features provided are hard-coded or otherwise provisioned by default. The degree of hard-coding versus user-configurability can vary from one embodiment to the next, and the claimed invention is not intended to be limited to any particular configuration scheme of any kind.

Architecture

Figure 2A:
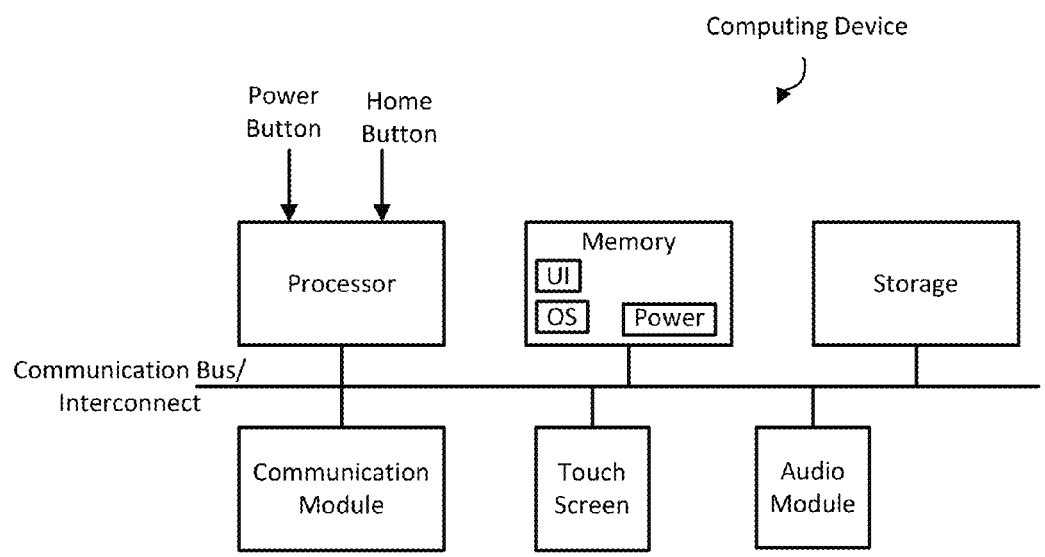
FIG. 2*a* illustrates a block diagram of a computing device configured in accordance with an embodiment of the present invention.

FIG. 2a illustrates a block diagram of a computing device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc.). Further note that although a touch screen display is provided, other touch sensitive embodiments may include a non-touch screen and a touch sensitive surface such as a track pad, or a touch sensitive housing configured with one or more acoustic sensors, etc. In this manner, a non-touch sensitive computing device can become a touch sensitive computing device by adding an interfacing touch sensitive component. However, as previously explained, some embodiments may be non-touch sensitive. The principles provided herein equally apply to any such computing device. For ease of description, examples are provided with touch screen technology.

The touch sensitive surface (touch sensitive display or touch screen, in this example) can be any device that is configured with user input detecting technologies, whether capacitive, resistive, acoustic, active or passive stylus, and/or other input detecting technology. The screen display can be layered above input sensors, such as a capacitive sensor grid for passive touch-based input (e.g., with a finger or passive stylus in the case of a so-called in-plane switching (IPS) panel), or an electro-magnetic resonance (EMR) sensor grid (e.g., for sensing a resonant circuit of the stylus). In some embodiments, the touch screen display can be configured with a purely capacitive sensor, while in other embodiments the touch screen display may be configured to provide a hybrid mode that allows for both capacitive input and active stylus input. In any such embodiments, a touch screen controller may be configured to selectively scan the touch screen display and/or selectively report contacts detected directly on or otherwise sufficiently proximate to (e.g., within a few centimeters) the touch screen display. The proximate contact may include, for example, hovering input used to cause location specific input as though direct contact were being provided on a touch sensitive surface (such as a touch screen). Numerous touch screen display configurations can be implemented using any number of known or proprietary screen based input detecting technology.

Continuing with the example embodiment shown in FIG. 2a, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine readable medium, that when executed by the processor (and/or co-processors), carries out the functionality of the device, including a zoom view mode as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button, home button, and touch sensitive surface. In other embodiments, the processor may be configured to receive input from other input devices, such as from a mouse or keyboard, for example, to determine if such devices are being used to perform a zoom or shift command. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory).

The display can be implemented, for example, with a 7 to 9 inch 1920≤1280 IPS LCD touchscreen touch screen, or any other suitable display and touch sensitive interface technology. The communications module can be, for instance, any suitable 802.11 b/g/n WLAN chip or chip set, which allows for connection to a local network so that content can be downloaded to the device from a remote location (e.g., content provider, etc., depending on the application of the display device). In some specific example embodiments, the device housing or frame that contains all the various componentry measures about 7" to 9" high by about 5" to 6" wide by about 0.5" thick, and weighs about 7 to 8 ounces. Any number of suitable form factors can be used, depending on the target application (e.g., laptop, smart phone, etc.). The device may, for example, smaller for smart phone and eReader applications and larger for tablet computer applications.

The operating system (OS) module can be implemented with any suitable OS, but in some example embodiments is implemented with Google Android OS or Linux OS or Microsoft OS or Apple OS. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The audio module can be configured, for example, to speak or otherwise aurally present a selected eBook or other textual content. In some example cases, if additional space is desired, for example, to store digital books or other content and media, storage can be expanded via a microSD card or other suitable memory expansion technology (e.g., 32 GBytes, or higher). The UI module can be, for example, based on touch screen technology, and the various example screen shots and example use-cases shown in FIGS. 1a, 1c-d, 3a-f+, 4a-c, and 5a-b, in conjunction with the zoom view mode methodologies demonstrated in FIG. 7, which will be discussed in turn.

Client-Server System

Figure 2B:
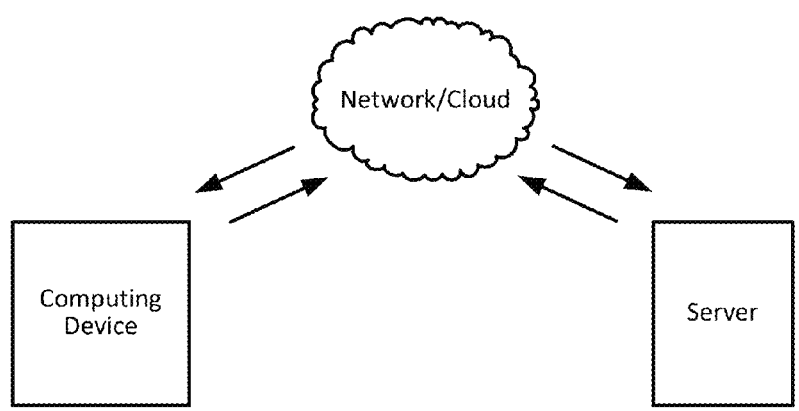
FIG. 2*b* illustrates a block diagram of a communication system including the computing device of FIG. 2*a*, configured in accordance with an embodiment of the present invention.

FIG. 2b illustrates a block diagram of a communication system including the computing device of FIG. 2a configured in accordance with an embodiment of the present invention. As can be seen, the system generally includes a computing device that is capable of communicating with a server via a network/cloud. In this example embodiment, the computing device may be, for example, an eReader, a smart phone, a laptop, a tablet computer, a desktop computer, or any other suitable computing device. The network/cloud may be a public and/or private network, such as a private local area network operatively coupled to a wide area network such as the Internet. In this example embodiment, the server may be programmed or otherwise configured to receive content requests from a user via the computing device and to respond to those requests by providing the user with requested or otherwise recommended content. In some such embodiments, the server may be configured to remotely provision a zoom view mode as provided herein to the computing device (e.g., via JavaScript or other browser based technology). In other embodiments, portions of the methodology may be executed on the server and other portions of the methodology may be executed on the device. Numerous server-side/client-side execution schemes can be implemented to facilitate a zoom view mode in accordance with one or more embodiments, as will be apparent in light of this disclosure.

Zoom View Mode Examples

Figure 3A:
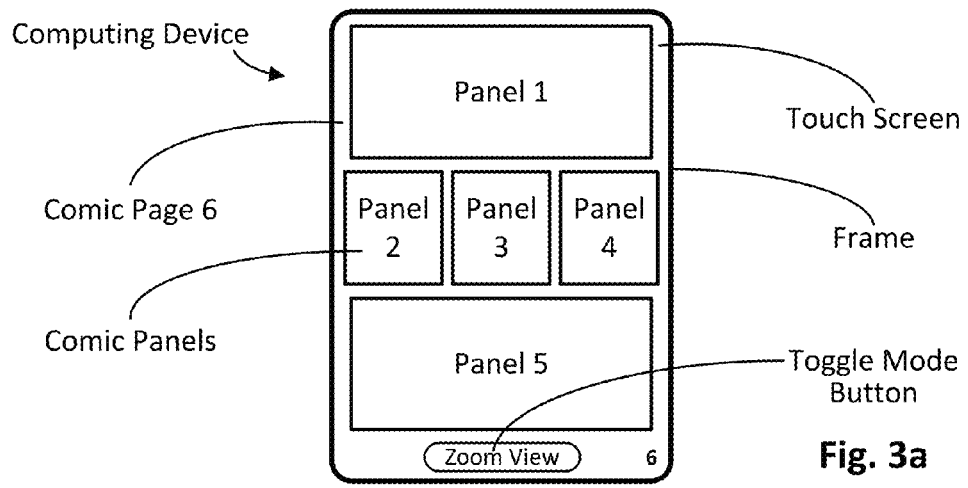

FIGS. 3a-f' collectively illustrate an example zoom view mode of a computing device, in accordance with an embodiment of the present invention. As can be seen in FIG. 3a, a computing device is shown having a housing/frame that includes a touch screen for displaying content and allowing user input (whether direct or proximate). The touch screen in FIG. 3a is displaying a digital comic, specifically page 6 of the comic, which has 5 panels on the page (panels 1-5) and advances from left to right. The comic may be displayed or otherwise presented using an eReader application, a comic reader application, or some other suitable application or program. Although the zoom view mode is being illustrated on a touch sensitive computing device having a touch screen, other touch sensitive computing devices may include a non-touch display screen that can be used in conjunction with a touch sensitive surface/interface, such as a track pad. As previously described, the zoom view mode may also be used on a non-touch sensitive computing device.

Continuing with the example case shown in FIG. 3a, a toggle mode button is included at the bottom of the touch screen, which can be selected to toggle between a normal view mode (e.g., where the user can manually zoom and pan on a page of content) and a zoom view mode. As shown, the comic is being viewed in a normal view mode, since the toggle mode button displays Zoom View, meaning that the button can be selected to invoke the zoom view mode. In this example embodiment, the panels on each page of the displayed comic are treated as regions of interest. However, regions for comic books may include any portion of the comic book page, including the whole page, multiple panels, a panel, a drawing within a panel, dialogue bubbles within a panel, or any other suitable area of a page. As previously described, the zoom view mode may be used with non-paginated digital content as well, and the claimed invention is not intended to be limited to any particular digital content or regions of interest, unless stated otherwise.

Figure 3B:
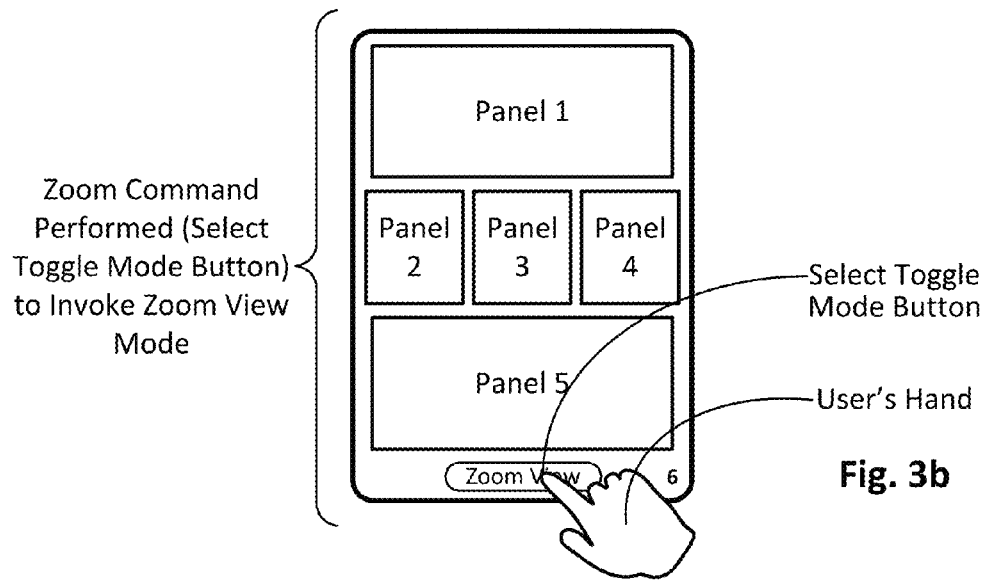
Figure 3B:
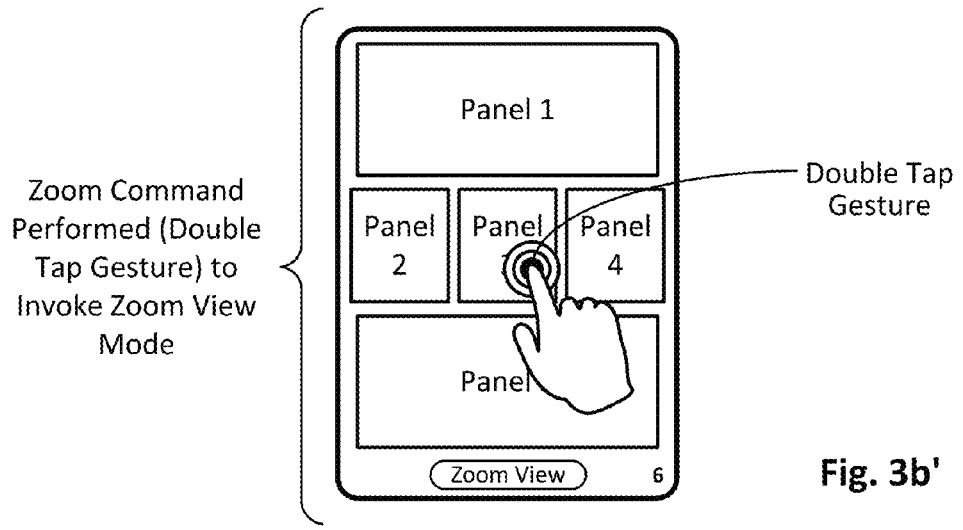

FIG. 3b shows a user performing a zoom command to invoke the zoom view mode. More specifically, the user (using a finger of the user's hand) is selecting the toggle mode button to invoke the zoom view mode. FIG. 3b' shows an alternative zoom command, a double tap gesture, which can also be used to invoke the zoom view mode As previously described, the zoom command may be any suitable input or action. The selection of the zoom command(s) may be user-configurable, hard-coded, or some combination thereof. After the zoom view mode has been invoked, the zoom view mode is configured to zoom in on the first region of interest along an invoke mode path of motion. Note that zooming in on the first region of interest may include any combination of zooming, panning, scanning, scrolling, tilting, page switching, and/or any other suitable technique. The invoke mode path of motion will be discussed in further detail with reference to FIGS. 6a-i. The result of invoking the zoom view mode to zoom in on a first region of interest (panel 1 in this example case) is shown in FIG. 3c. Note that the toggle mode button has changed from Zoom View to Normal View, since the comic book is now being viewed in zoom view mode.

As shown in FIG. 3c, the zoom view mode zoomed in on panel 1 in response to either of the zoom commands shown FIG. 3b (toggle mode button selection) or 3b' (double tap gesture). In this example embodiment, the zoom view mode is configured to zoom in on the first region of interest on the page, which in this case is panel 1. In other embodiments, the zoom view mode may be configured to zoom in on a region of interest based on proximity or some other suitable factor. For example, in such an embodiment, the zoom command shown in FIG. 3b' would cause the zoom view mode to zoom in on panel 3 instead of panel 1, since the zoom command was performed on panel 3.

Figure 3E:
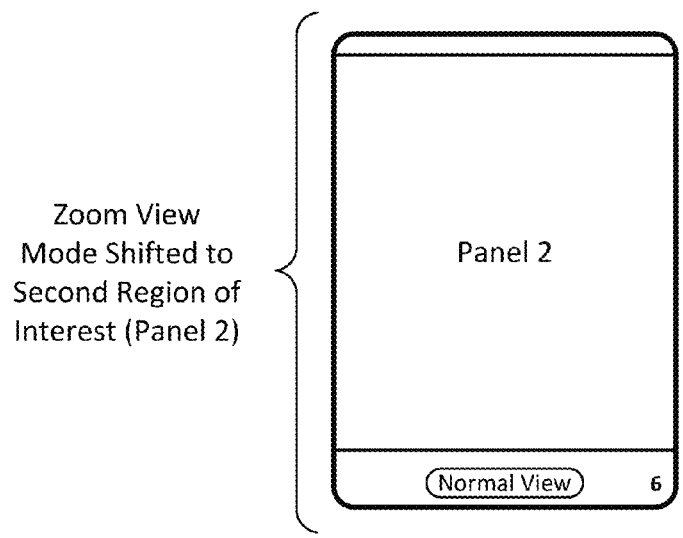

FIGS. 3d and 3d' show two examples of shift commands being performed to shift to the next region of interest, which in this example case is panel 2 on page 6. The shift command shown in FIG. 3d is a swipe gesture made from right to left to move to the next region of interest (since the comic is read from left to right in this example case). In such an example, a swipe gesture made from left to right may be used to move to the previous region of interest (the last region of interest on page 6 in this example case). The shift command shown in FIG. 3*d'* is a single tap gesture made on the right side of the comic page to move to the next region of interest (once again, since the comic is read from left to right in this example case). In such an example, a single tap gesture made on the left side of the comic page may be used to move to the previous region of interest (the last region of interest on page 6 in this example case). As previously described, the shift command may be any suitable input or action. After a shift command has been issued (e.g., as shown in FIG. 3*d* or 3*d'*), the zoom view mode is configured to shift to the next region of interest along a shift path of motion. Note that shifting to another region of interest may include any combination of zooming, panning, scanning, scrolling, tilting, page switching, and/or any other suitable technique. The shift path of motion will be discussed in further detail with reference to FIGS. 6*a-i*. The result of shifting to the next region of interest (panel 2 in this example case) is shown in FIG. 3*e*.

Figure 3F:
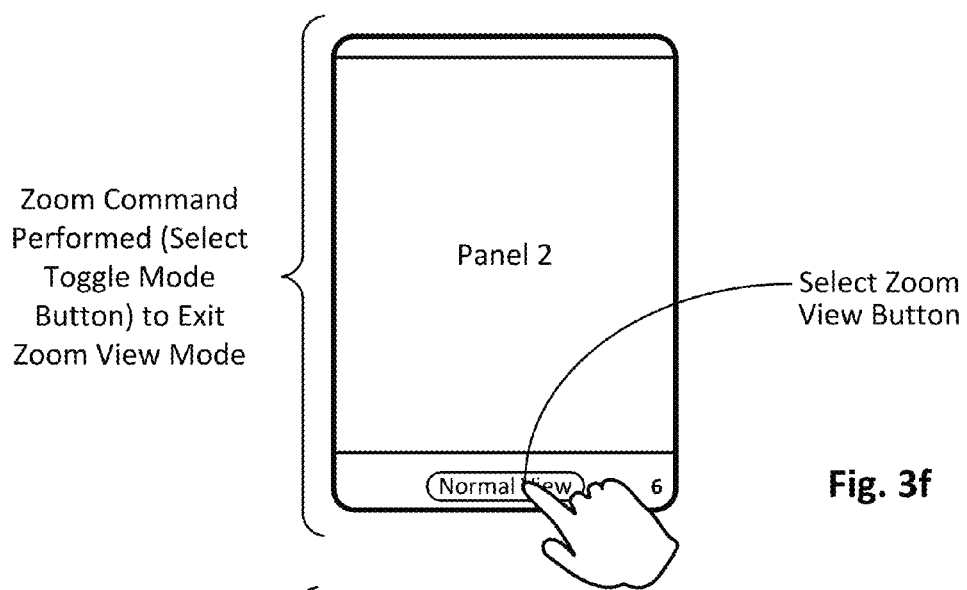
Figure 3F:
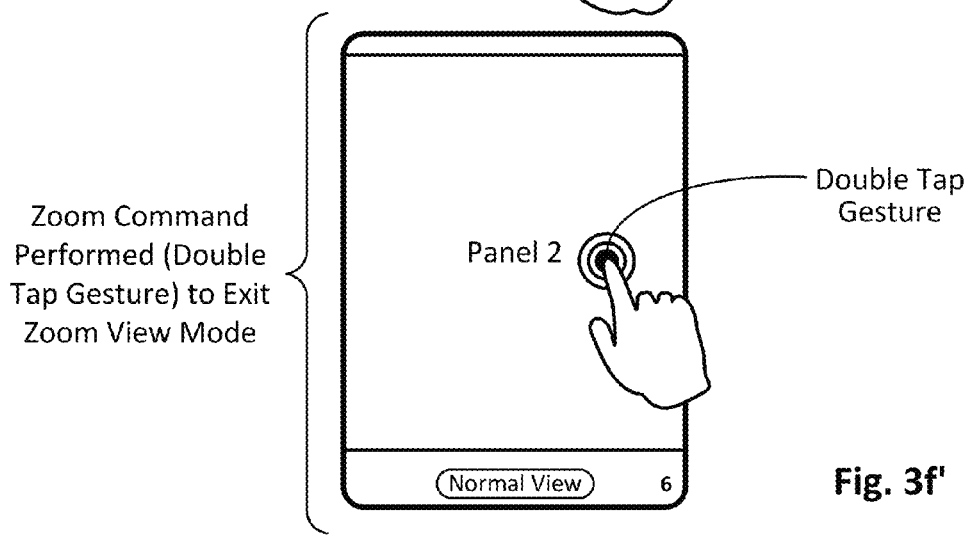

FIGS. 3*f* and 3*f'* show two examples of zoom commands being performed to exit the zoom view mode and zoom out from the currently displayed (or otherwise presented) region of interest (panel 2 in this example case). The zoom commands shown in FIGS. 3*f* (select toggle mode button) and 3*f'* (double tap gesture) are similar to the zoom commands shown in FIGS. 3*b* (select toggle mode button) and 3*b'* (double tap gesture), except that the zoom commands are being used in FIGS. 3*f* and 3*f'* to exit the zoom view mode. After a zoom command has been issued (e.g., as shown in FIG. 3*f* or 3*f'*), the zoom view mode is configured to zoom out from the region of interest along an exit mode path of motion. Note that zooming out from a region of interest may include any combination of zooming, panning, scanning, scrolling, tilting, page switching, and/or any other suitable technique. The exit mode path of motion will be discussed in further detail with reference to FIGS. 6*a-i*. The result of shifting to the next region of interest (panel 2 in this example case) is shown in FIG. 3*e*. The result of exiting the zoom view mode to zoom out from the region of interest (panel 2 in this example case) is shown in FIG. 3*a*. As previously described, note that the toggle mode button displays Zoom View in FIG. 3*a*, since the comic book is being shown in Normal View in FIG. 3*a*.

Figure 4A:
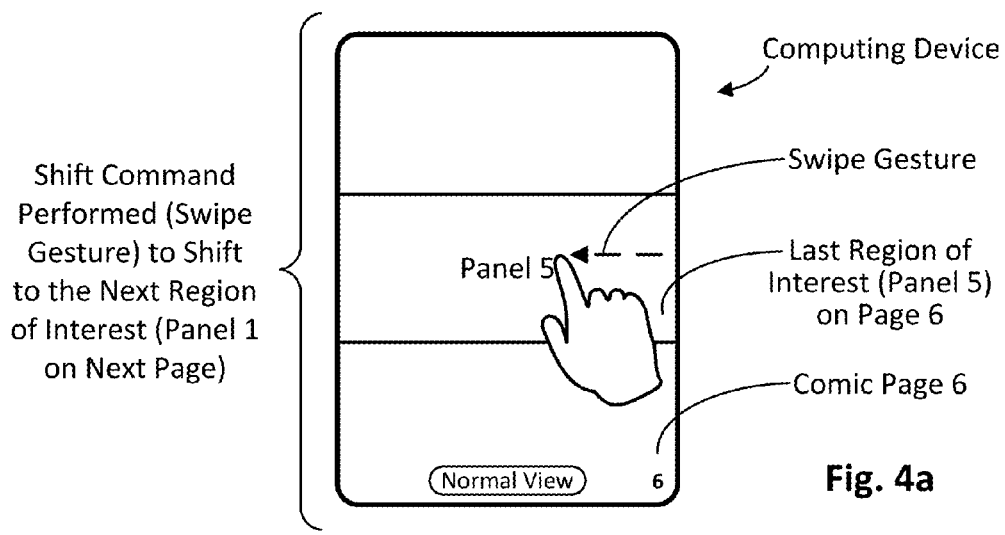
FIGS. 4*a-c* collectively illustrate an example provide context feature for a zoom view mode of a computing device, in accordance with an embodiment of the present invention.
Figure 4B:
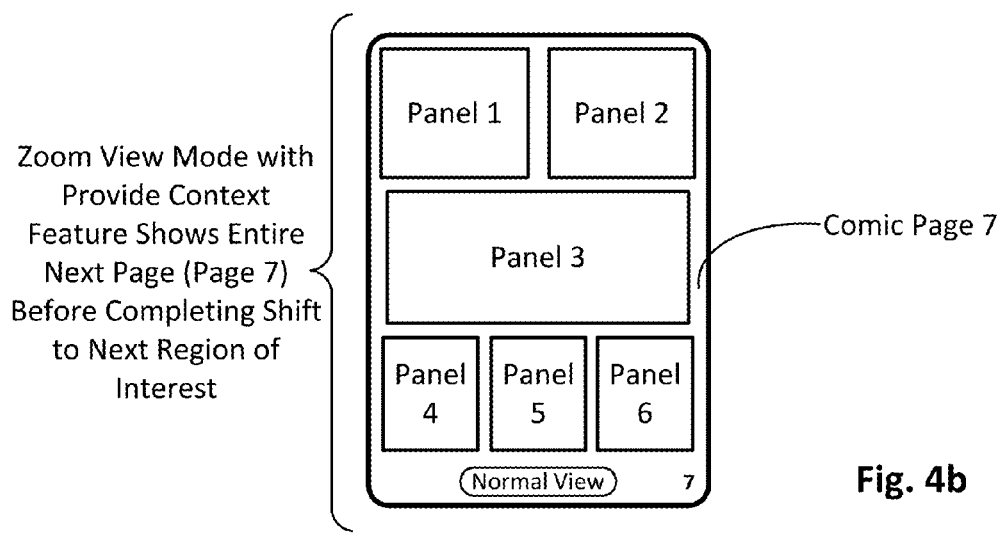
Figure 4C:
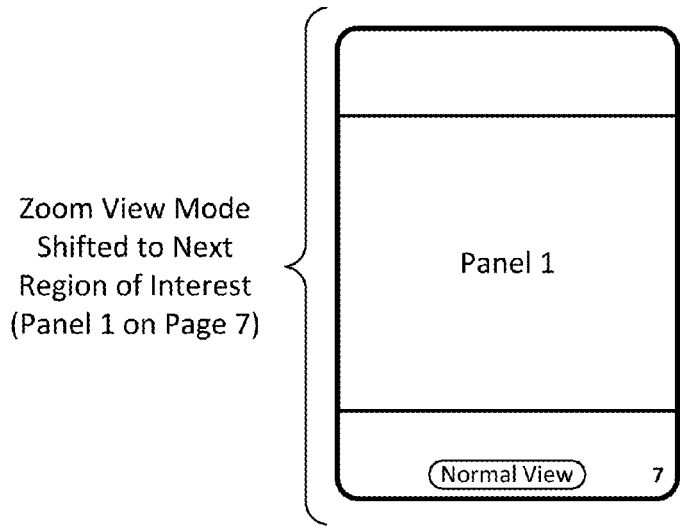

FIGS. 4*a-c* collectively illustrate an example provide context feature for a zoom view mode of a computing device, in accordance with an embodiment of the present invention. FIG. 4*a* shows the same computing device as shown in FIG. 3*a* and described herein. However, FIG. 4*a* starts with the zoom view mode invoked and zoomed in on the last region of interest on the page (panel 5 on page 6 in this example case). As can also be seen in FIG. 4*a*, a right to left swipe gesture shift command is being performed to shift to the next region of interest, which in this example case is the first region of interest on the next page (panel 1 on page 7). In this example embodiment, the zoom view mode includes a provide context feature that is configured to display (or otherwise present) the entire second page when shifting from a region of interest on a first page to a region of interest on a second page. In this example case, the shift command shown in FIG. 4*a* causes the provide context feature to display all of page 7 as shown in FIG. 4*b*, before zooming in on panel 1 on page 7 to complete the shift to that region of interest. In this manner, the zoom view mode can provide context for panel 1 on page 7 by first showing all of page 7 before completing the shift to panel 1 as shown in FIG. 4*c*.

In the embodiment shown in FIGS. 4*a-c*, the provide context feature is configured to automatically display (or otherwise present) the entirety of page 7 when shifting there from page 6. In such an embodiment, the duration that page 7 is shown in its entirety may be user-configurable, hard-coded, or some combination thereof. In other embodiments, the provide context feature may be configured such that the user has to provide additional user input to complete the shift or zoom in on the first region of interest (e.g., from FIG. 4*b* to FIG. 4*c*). In such embodiments, the user may have to provide another shift command to continue from the page being shown in its entirety (e.g., as shown in FIG. 4*b*) to the appropriate region of interest (e.g., as shown in FIG. 4*c*), or some other suitable input or action. In this example embodiment, the provide context feature is configured to display (or otherwise present) the page being shifted to. For example, if FIGS. 4*a-c* were performed in reverse to shift from panel 1 on page 7 back to panel 5 on page 6, the page 6 would be shown in its entirety before shifting to panel 5 on page 6 (which is still the page being shifted to). However, in some embodiments, the provide context feature may be configured to display (or otherwise present) just the page being shifted from, or both the page being shifted from and the page being shifted to. For example, page 6 may have been shown in its entirety, or both pages 6 and 7 may have been shown in their entirety when shifting from panel 5 on page 6 (shown in FIG. 4*a*) to panel 1 on page 7 (shown in FIG. 4*c*).

FIGS. 5*a-b* collectively illustrate an example letterboxing feature for a zoom view mode of a computing device, in accordance with an embodiment of the present invention. FIG. 5*a* shows the same computing device as shown in FIG. 4*a* and described herein. However, FIG. 5*a* starts with the zoom view mode invoked and zoomed in on the first region of interest on the page (panel 1 on page 6 in this example case). In this example embodiment, the zoom view mode includes a letterboxing feature that is configured to focus on the region of interest. For example, as shown in FIG. 5*a*, a black letterboxing portion is provided above and below panel 1, which may help focus the user's eyes on panel 1 (compare FIG. 5*a* to FIG. 3*c*, for example). Note that the toggle mode button is still apparent to allow for user selection. FIG. 5*a'* shows an alternative letterboxing portion, where the adjacent panels (panels 2-4 in this example case) are shown in a shaded manner. FIG. 5*b* shows the zoom view mode shifted to a second region of interest (panel 2 on page 6 in this example case) from either of FIG. 5*a* or 5*a'*.

The examples shown in FIGS. 5*a-b* are provided for illustrative purposes. However, the letterboxing feature of the zoom view mode may help focus on the zoomed in on region of interest in any suitable manner. For example, in some embodiments, the letterboxing portion may be a semi-transparent covering/shading of all or some of the displayed content outside of a region of interest when zoomed in on the region of interest using the zoom view mode. In such embodiments, the covering/shading may be, for example, 95%, 90%, 80%, 75%, 60%, or 50% transparent, or any other suitable amount of opacity or transparency. In some embodiments, the color of the letterboxing feature covering/shading may be based on the background color of the digital content. For example, if the background of a page of a comic is white, the letterboxing feature may use a white covering to blend in with the comic background or a black covering to help the region of interest stand out. In some embodiments, the color of the letterboxing feature covering/shading may use thematic color matching. For example, the colors of the letterboxing feature could be dynamic and may change based on the mood trying to be evoked by the current region of interest. In such an example, the covering/shading may be red to evoke anger or love, blue to evoke calmness or peace, or yellow to evoke excitement or energy, just to name a few examples. In this manner, the letterboxing feature covering/shading may supplement the viewing experience when using the zoom view mode. The appearance of the letterboxing feature covering/shading, may be included with or based on the digital content being viewed using the zoom view mode. For example, the content may include data indicative of the background color or the zoom view mode may automatically detect the background color, such that it can be used to help define the letterboxing feature covering/shading. In addition, these and other aspects of the letterboxing feature may be user-configurable, hard-coded, or some combination thereof, as previously described with reference to FIG. 1d.

As previously described, the zoom view mode may be configured such that the characteristics of the paths of motion may enhance the user experience. One such characteristic is the speed of the zoom view mode paths of motion. Remember that the paths of motion include: a) an invoke mode path of motion, which is the path of motion used when zooming in on a region of interest in response to a zoom command used to invoke the zoom view mode; b) an exit mode path of motion, which is the path of motion used when zooming out from a region of interest in response to a zoom command used to exit the zoom view mode; and c) a shift path of motion, which is the path of motion used to shift from a first region of interest to a second region of interest in response to a shift command. Also remember that although the invoke mode and exit mode paths of motion are discussed in the context of zooming in on/out from a region of interest, the paths of motion may include any combination of zooming, panning, scanning, scrolling, tilting, page switching, and/or any other suitable technique. For example, in some embodiments, the zoom view mode paths of motion may be configured to zoom along a z-axis and pan along x and y-axes when zooming in to/out from a region of interest or shifting from one region of interest to another. In such embodiments, the zoom view mode may be configured to display (or otherwise present) as much of the region of interest as possible (e.g., while maintaining the proper shape or ratio of the region of interest). In such embodiments, the speed of the zooming and/or panning may be non-constant (as described herein) to, for example, provide a more pleasing viewing experience. In some embodiments, the zoom view mode may be further configured to tilt the digital content when zooming in to/out from a region of interest or shifting from one region of interest to another, such as when using the zoom view mode for three dimensional digital content.

In some embodiments, the zoom view mode may be configured to use non-constant speeds or velocities when zooming in on/out from a region of interest, or shifting from one region of interest to another. For example, in some cases, the shift path of motion may start out at a fast first speed and decelerate before reaching the other region of interest. In another example case, the shift path of motion may start out at a slow first speed and accelerate before reaching the other region of interest. In another example case, the shift path of motion may start out at a first (slower) speed, accelerate to a second (faster) speed, and then decelerate before reaching the other region of interest. In another example case, the shift path of motion may start out at a first (faster) speed, decelerate to a second (slower) speed, and then accelerate before reaching the other region of interest. In this manner, the speed of the path of motion may be set to provide a more pleasing experience when shifting from one region of interest to another. Such example speeds for the shift path of motion may also be used for the invoke mode or exit mode paths of motion. In addition, the speeds or velocities for the zoom view mode paths of motion may be user-configurable, hard-coded, or some combination thereof (e.g., where the invoke mode path of motion speed is hard-coded but the shift path of motion speed is user-configurable).

In some embodiments, the speeds or velocities of the paths of motion may be defined by a non-linear easing function curve or easing equation. FIGS. 6a-i show example non-linear easing function curves used to define the speed of zoom view mode paths of motion, in accordance with one or more embodiments of the present invention. The easing function curves shown in FIGS. 6a-i are on a graph having an x-axis of time (t) and a y-axis of a property of function of time (x). The property of the function of time (x), as used herein, is a point along a path of motion or movement, such as a zoom view mode path of motion. Therefore, the slopes of the curves shown correspond to speed or velocity for a path of motion, which can be used to define the speed or velocity of the zoom view mode paths of motion, such as the shift path of motion, invoke mode path of motion, or exit mode path of motion as variously described herein. The examples shown in FIGS. 6a-i and described herein are provided for illustrative purposes only, and the claimed invention is not intended to be limited to having paths of motion following any particular speed, unless stated otherwise.

FIGS. 6a-c show non-linear easing function curves that accelerate and/or decelerate using a sine formula (e.g., $x=1-[\sin(1-t)*\pi/2]$). More specifically, FIG. 6a shows an ease-in sinusoidal curve that accelerates using a sine formula, FIG. 6b shows an ease-out sinusoidal curve that decelerates using a sine formula, and FIG. 6c shows an ease-in-out sinusoidal curve that accelerates and then decelerates using a sine formula. FIGS. 6d-f show non-linear easing function curves that accelerate and/or decelerate using an exponential formula (e.g., $f(t)=t^2$, $f(t)=t^3$, $f(t)=t^4$, etc.). More specifically, FIG. 6d shows an ease-in exponential curve that accelerates using an exponential formula, FIG. 6e shows an ease-out exponential curve that decelerates using an exponential formula, and FIG. 6f shows an ease-in-out exponential curve that accelerates and then decelerates using an exponential formula.

FIGS. 6g-i show non-linear easing function curves that accelerate and/or decelerate to create a bouncing effect. In this manner, these easing function curves may be used to define the speed of a zoom view mode path of motion to provide a visual animation. For example, when shifting from one region of interest to another, the ease-in bounce curve shown in FIG. 6g may be used to provide a visual animation of an increasing bounce when shifting to the other region of interest, the ease-out curve shown in FIG. 6h may be used to provide a visual animation of a decreasing bounce when shifting to the other region of interest, and the ease-in-out curve shown in FIG. 6i may be used to provide a visual animation of a bounce that increases then decreases when shifting to the other region of interest. Other animations may be provided based on the speed of the zoom view mode paths of motion, such as by using an elastic easing function, for example. As previously described, the zoom view mode paths of motion may also include a sound or music, such as a swoosh sound during the invoke mode or exit mode paths of motion or a transitional sound effect when shifting from one region of interest to another, for example. In addition, the mode paths of motion may include tactile feedback, such as vibrations from the computing device to enhance the user experience when using the zoom view mode. Numerous variations and configurations will be apparent in light of this disclosure.

As will be further appreciated in light of this disclosure, the shift path of motion can have a shape that is also non-linear, such as curve or wave shape. Thus, the animation of transitioning from one region of interest to the next can effectively follow the desired path of motion. In one embodiment, rather than moving in a straight line while zooming from one region of interest to another, the shift path of motion may occur for instance in an arc when the easing equation follows a bell curve, which translates to slow motion at the beginning of the arc, relatively fast motion in the middle portion of the arc, and then slow motion at the end of the arc, which culminates at the region of interest.

Methodology

Figure 7:
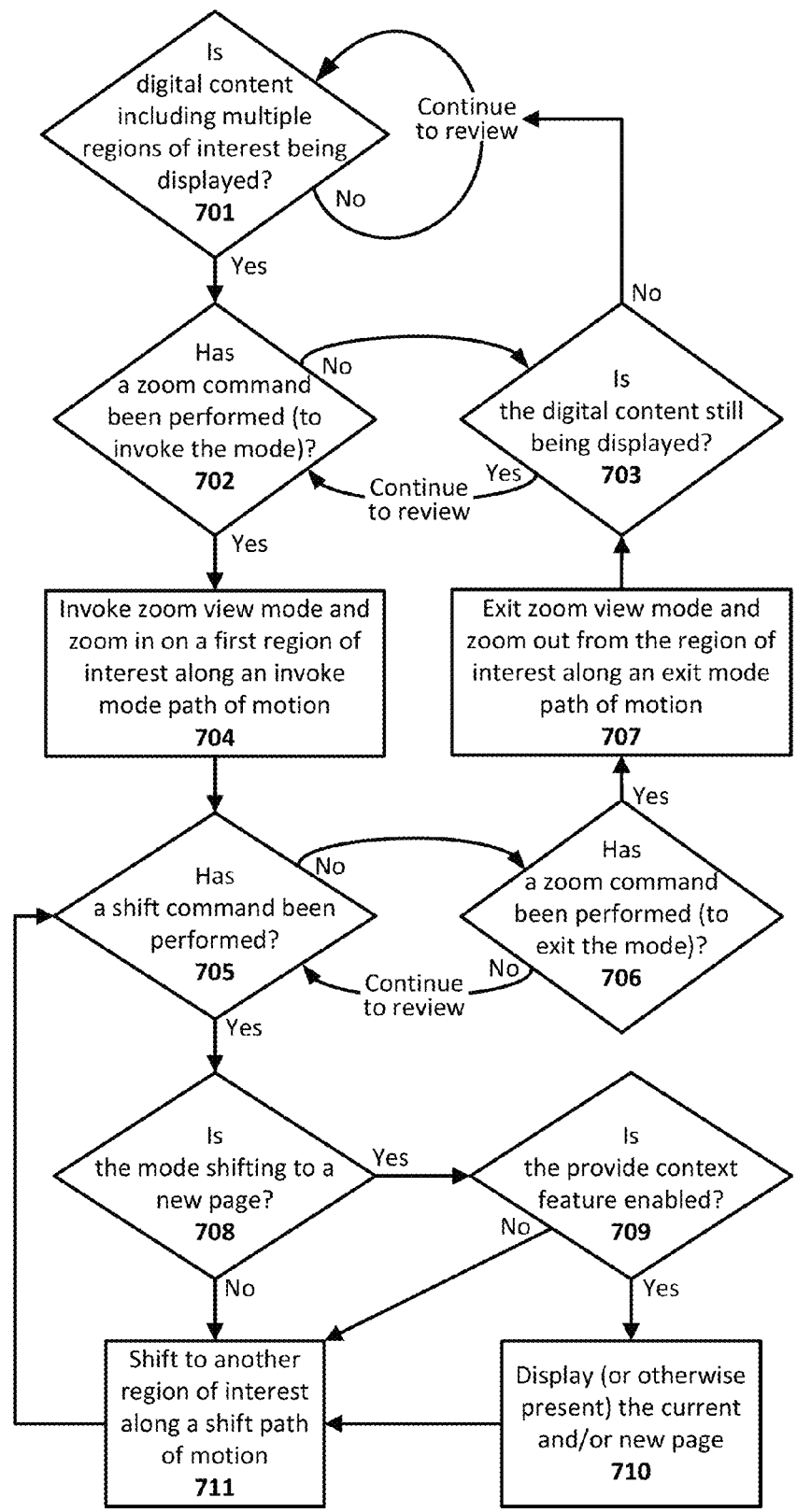
FIG. 7 illustrates a method for providing a zoom view mode in a computing device, in accordance with an embodiment of the present invention.

FIG. 7 illustrates a method for providing a zoom view mode in a computing device, in accordance with an embodiment of the present invention. This example methodology may be implemented, for instance, by the UI module of the example computing device shown in FIG. 2a, or the example computing device shown in FIG. 2b (e.g., with the UI provisioned to the client by the server). To this end, the UI may be implemented in software, hardware, firmware, or any suitable combination thereof, as will be appreciated in light of this disclosure. In computing devices including a touch screen or other touch sensitive interface, the computing device may be able to detect contact, whether direct or proximate (e.g., via hovering input), which can be used in various ways to implement UI functionality, including performing a zoom command or a shift command as variously described herein.

In the example case illustrated in FIG. 7, the method starts by determining 701 if digital content including multiple regions of interest is being displayed. The digital content may be displayed using any appropriate application or program, such as an eReader application, a comic reading application, a map browser, a gallery application, or any other suitable application or program. As such, the digital content including multiple regions of interest may include various types of digital content, such as eBooks, comics, magazines or catalogs, maps, photos, or any other suitable digital content, whether or not the digital content is paginated or otherwise similarly divided. As previously described, a region of interest may be any pre-defined area of the digital content, such that the zoom view mode may be used to shift between the regions of interest, as variously described herein. For example, the digital content may be a comic book and the regions of interest may include the panels (or other portions, such as multiple panels, dialogue boxes or illustrations within a single panel, etc.) on each page of the comic, such that the zoom view mode may be used to enhance the reading experience of the comic. In another example, the digital content may be a children's book and the regions of interest may include illustrations within the children's book, such that the zoom view mode may be used to quickly shift from illustration to illustration. In another example, the digital content may be a map and the regions of interest may include locations on the map, such that the zoom view mode may be used to allow the user to take a guided tour of the map.

Continuing from diamond 701 shown in FIG. 7, if digital content including multiple regions of interest is not being displayed (or otherwise presented), the method continues to review until such content is displayed. In some embodiments, the zoom view mode may be tied to one or more applications capable of displaying digital content that includes multiple regions of interest and the mode may not be available until one such application is running, active, and/or displayed (which may result in a conservation of device power and/or memory). Once digital content including multiple regions of interest is being displayed, the method continues by determining 702 if a zoom command has been performed (to invoke the zoom view mode). Example zoom commands may include a double tap gesture, a selection of a zoom view mode button or toggle view mode button, a pinch gesture, or a double click input (e.g., a mouse double click), just to name a few examples. If a zoom command has not been performed to invoke the mode, the method continues by reviewing 703 if the digital content (including multiple regions of interest) is still being displayed. If the digital content is not still being displayed, the method starts back at diamond 701 to review if digital content including multiple regions of interest is being displayed. If the digital content is still being displayed, the method continues to review until either a zoom command has been performed to invoke the mode or until the digital content is no longer being displayed.

Once a zoom command has been performed (to invoke the mode) while digital content including multiple regions of interest is being displayed (or otherwise presented), the method continues by invoking 704 the zoom view mode and zooming in on a first region of interest along an invoke mode path of motion, as variously described herein. Remember that although the invoke mode path of motion is discussed in the context of zooming in on a region of interest, the path of motion may include any combination of zooming, panning, scanning, scrolling, tilting, page switching, and/or any other suitable technique. Note that in some embodiments, the zoom view mode may be configured to zoom in on a first region of interest regardless of where the zoom command was performed, while in other embodiments, the zoom view mode may be configured to zoom in on the region of interest closest to where the zoom command was performed. The method continues by determining 705 if a shift command has been performed. The shift command may include a swipe gesture, a single tap gesture, or a click input (e.g., a mouse click), just to name a few examples.

Continuing from diamond 705, if a shift command has not been performed, the method continues by determining 706 if a zoom command has been performed (to exit the zoom view mode). If a zoom command has been performed (while the mode is invoked), then the method continues by exiting 707 the zoom view mode and zooming out from the region of interest (that it is currently zoomed in on) along an exit mode path of motion. Remember that although the exit mode path of motion is discussed in the context of zooming out from a region of interest, the path of motion may include any combination of zooming, panning, scanning, scrolling, tilting, page switching, and/or any other suitable technique. After exiting the zoom view mode, the method continues to diamond 703 to determining if the digital content (including multiple regions of interest) is still being displayed. If a zoom command has not been performed to exit the zoom view mode, the method continues to review until either a shift command has been performed or until a zoom command has been performed to exit the mode.

If a shift command has been performed while the zoom view mode is still invoked, the method continues by determining 708 if the mode is shifting to a new page within the digital content. If the mode is shifting to a new page (e.g., when using the zoom view mode with paginated content), the method continues by determining if the provide context feature (as variously described herein) is enabled. If the provide context feature is enabled, the zoom view mode may be configured to display (or otherwise present) the current and/or the new page of content before shifting to another region of interest. After displaying (or otherwise presenting) the current and/or new page to provide context, the method continues by shifting 711 to another region of interest (the appropriate region of interest based on, for example, the direction of the shift command) along a shift path of motion. If in response to a shift command, the mode is not shifting to a new page or the provide context feature is not enabled, the mode simply continues by shifting 711 to another region of interest (the appropriate region of interest based on, for example, the direction of the shift command) along a shift path of motion. Remember that although the shift mode path of motion is discussed in the context of shifting from one region of interest to another, the path of motion may include any combination of zooming, panning, scanning, scrolling, tilting, page switching, and/or any other suitable technique. After the shifting has been performed, the method continues back to diamond 705 to determine if another shift command has been provided or if a zoom command has been performed to exit the mode.

Numerous variations and embodiments will be apparent in light of this disclosure. One example embodiment of the present invention provides a device including a display for displaying paginated digital content including multiple regions of interest to a user, and a user interface. The user interface includes a zoom view mode, wherein in response to a zoom command, the zoom view mode is configured to zoom in on a region of interest on the current page of content, and wherein in response to a shift command, the zoom view mode is further configured to shift to another region of interest along a shift path of motion having a non-constant speed. In some cases, the shift path of motion starts out at a fast speed and decelerates before reaching the other region of interest. In some cases, the shift path of motion starts out at a slow speed and accelerates before reaching the other region of interest. In some cases, the shift path of motion starts out at a slow speed, accelerates to a fast speed, and then decelerates before reaching the other region of interest. In some cases, the shift path of motion speed is defined by a non-linear easing function curve. In some cases, the shift path of motion speed is defined by an ease-in-out function curve. In some cases, the zoom command is one of a double tap gesture on the current page of content and a selection of a toggle mode button. In some cases, device of claim 1 wherein the shift command is one of a swipe gesture and a single tap gesture. In some cases, in response to a shift command used to shift from a region of interest on the current page of content to a region of interest on another page of the content, the zoom view mode is configured to momentarily present the entire current page and/or the entire other page before zooming in on the region of interest on the other page of content. In some cases, the zoom view mode is configured to cover or shade areas outside of the region of interest when more than the region of interest is displayed. In some cases, the shift path of motion includes at least one of an animation, a sound, and a vibration. In some cases, in response to a zoom command performed after the zoom view mode has been invoked, the zoom view mode is configured to zoom out from a region of interest along an exit mode path of motion. In some cases, the functionality of the zoom view mode is integrated within an eReader application. In some cases, the zoom view mode is user-configurable.

Another example embodiment of the present invention provides a mobile computing device including a touch screen display for displaying content including multiple regions of interest to a user and allowing user input, and a user interface. The user interface includes a zoom view mode, wherein in response to a zoom command, the zoom view mode is configured to zoom in on a region of interest on the current page of content along an invoke mode path of motion, and wherein in response to a shift command, the zoom view mode is further configured to shift to another region of interest along a shift path of motion having a speed defined by a non-linear easing function curve. In some cases, the invoke mode path of motion speed is defined by a non-linear easing function curve. In some cases, the non-linear easing function curve is one of an ease-in, an ease-out, and an ease-in-out easing function curve.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to invoke a zoom view mode and zoom in on a region of interest on a page of digital content that includes multiple regions of interest in response to a zoom command performed on the page, and shift to another region of interest along a shift path of motion having a non-constant speed in response to a shift command performed while the zoom view mode is invoked. In some cases, the shift path of motion is arc-shaped and has a speed that is defined by a non-linear easing function curve. In some cases, in response to a shift command used to shift between a first region of interest on a first page of the content and a second region of interest on a second page of the content, the zoom view mode is configured to present the entire first page and/or the entire second page before zooming in on the second region of interest.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device, comprising:
  a display for displaying paginated digital content including multiple regions of interest to a user; and
  a user interface including a zoom view mode, wherein in response to a zoom command, the zoom view mode is configured to zoom in on a region of interest on the current page of content, and wherein in response to a shift command, the zoom view mode is further configured to shift to another region of interest along a shift path of motion having a non-constant speed defined by an easing function, the easing function defined by one of a sinusoidal, exponential, and bouncing formula, and the easing function further defined by one of an ease-in, ease-out, and ease-in-out curve.

2. The device of claim 1 wherein the shift path of motion starts out at a fast speed and decelerates before reaching the other region of interest.

3. The device of claim 1 wherein the shift path of motion starts out at a slow speed and accelerates before reaching the other region of interest.

4. The device of claim 1 wherein the shift path of motion starts out at a slow speed, accelerates to a fast speed, and then decelerates before reaching the other region of interest.

5. The device of claim 1 wherein the shift path of motion speed is defined by a sinusoidal formula.

6. The device of claim 5 wherein the shift path of motion speed is defined by an ease-in-out function curve.

7. The device of claim 1 wherein the zoom command is one of a double tap gesture on the current page of content and a selection of a toggle mode button.

8. The device of claim 1 wherein the shift command is one of a swipe gesture and a single tap gesture.

9. The device of claim 1 wherein in response to a shift command used to shift from a region of interest on the current page of content to a region of interest on another page of the content, the zoom view mode is further configured to momentarily present the entire current page and/or the entire other page before zooming in on the region of interest on the other page of content.

10. The device of claim 1 wherein the zoom view mode is further configured to cover or shade areas outside of the region of interest when more than the region of interest is displayed.

11. The device of claim 1 wherein the shift path of motion includes at least one of an animation, a sound, and a vibration.

12. The device of claim 1 wherein in response to a zoom command performed after the zoom view mode has been invoked, the zoom view mode is further configured to zoom out from a region of interest along an exit mode path of motion.

13. The device of claim 1 wherein the functionality of the zoom view mode is integrated within an eReader application.

14. The device of claim 1 wherein the zoom view mode is user-configurable.

15. A mobile computing device, comprising:
a touch screen display for displaying content including multiple regions of interest to a user and allowing user input; and
a user interface including a zoom view mode, wherein in response to a zoom command, the zoom view mode is configured to zoom in on a region of interest on the current page of content along an invoke mode path of motion, and wherein in response to a shift command, the zoom view mode is further configured to shift to another region of interest along a shift path of motion having a speed defined by a non-linear easing function curve, the easing function defined by one of a sinusoidal, exponential, and bouncing formula, and the easing function further defined by one of an ease-in, ease-out, and ease-in-out curve.

16. The device of claim 15 wherein the invoke mode path of motion speed is defined by a non-linear easing function curve.

17. The device of claim 15 wherein the non-linear easing function curve is defined by an exponential formula.

18. A non-transitory computer program product comprising a plurality of instructions encoded thereon to facilitate operation of an electronic device according to the following process:
in response to a zoom command performed on a displayed page of digital content including multiple regions of interest, invoke a zoom view mode and zoom in on a region of interest on the page; and
in response to a shift command performed while the zoom view mode is invoked, shift to another region of interest along a shift path of motion having a non-constant speed defined by an easing function, the easing function defined by one of a sinusoidal, exponential, and bouncing formula, and the easing function further defined by one of an ease-in, ease-out, and ease-in-out curve.

19. The computer program product of claim 18 wherein the shift path of motion is arc-shaped and has a speed that is defined by a non-linear easing function curve and further defined by a bouncing formula.

20. The computer program product of claim 18 wherein in response to a shift command used to shift between a first region of interest on a first page of the content and a second region of interest on a second page of the content, the zoom view mode is further configured to present the entire first page and/or the entire second page before zooming in on the second region of interest.

* * * * *